US012780194B2

(12) United States Patent
Valverde

(10) Patent No.: US 12,780,194 B2
(45) Date of Patent: Nov. 3, 2026

(54) GENERATING AND SELECTING CANDIDATE TRAJECTORIES

(71) Applicant: Torc Robotics, Inc., Blacksburg, VA (US)

(72) Inventor: Rikki Valverde, Bala Cynwyd, PA (US)

(73) Assignee: TORC Robotics, Inc., Blacksburg, VA (US)

( * ) Notice: Subject to any disclaimer, the term of this patent is extended or adjusted under 35 U.S.C. 154(b) by 0 days.

(21) Appl. No.: 19/214,573

(22) Filed: May 21, 2025

(65) Prior Publication Data

US 2025/0282352 A1 Sep. 11, 2025

Related U.S. Application Data

(63) Continuation of application No. 18/110,829, filed on Feb. 16, 2023, now Pat. No. 12,330,643.

(Continued)

(51) Int. Cl.

| | |
|---|---|
| ***B60W 30/14*** | (2006.01) |
| ***B60W 30/18*** | (2012.01) |
| ***B60W 60/00*** | (2020.01) |

(52) U.S. Cl.

CPC .... *B60W 30/143* (2013.01); *B60W 30/18009* (2013.01); *B60W 60/0013* (2020.02);

(Continued)

(58) Field of Classification Search

CPC ......... B60W 30/143; B60W 30/18009; B60W 60/0013; B60W 2420/403; B60W 2420/408; B60W 2520/10; B60W 2554/20; B60W 2554/40; B60W 2554/802; B60W 2720/106; B60W 2720/10

See application file for complete search history.

(56) References Cited

U.S. PATENT DOCUMENTS

| | | | | |
|---|---|---|---|---|
| 12,077,181 | B1 * | 9/2024 | Costantino | B60W 60/0011 |
| 2019/0317512 | A1 * | 10/2019 | Zhang | B60W 60/00 |

(Continued)

OTHER PUBLICATIONS

Werling et al., "Optimal Trajectory Generation for Dynamic Street Scenarios in a Frenet Frame," IEEE International Conference on Robotics and Automation, May 2010, pp. 987-993.

*Primary Examiner* — Kito R Robinson
*Assistant Examiner* — Tanya C Sienko
(74) *Attorney, Agent, or Firm* — Armstrong Teasdale LLP

(57) ABSTRACT

Disclosed herein are systems and methods for operating a vehicle. In an embodiment, a system can identify a maximum distance bound based on one or more objects around a vehicle; for each of a plurality of candidate trajectories for the vehicle, determine a velocity from the maximum distance bound at an ending time of the candidate trajectory; determine an available distance for the candidate trajectory as a function of the determined velocity at the ending time of the candidate trajectory and a comfort deceleration parameter; determine a target velocity for the candidate trajectory; and determine a velocity difference between the target velocity and a final velocity of the candidate trajectory at the ending time of the candidate trajectory; select a first candidate trajectory based on the velocity difference; and operate the vehicle based on the selected first candidate trajectory.

20 Claims, 11 Drawing Sheets

Related U.S. Application Data

(60) Provisional application No. 63/376,866, filed on Sep. 23, 2022.

(52) U.S. Cl.
CPC . *B60W 2420/403* (2013.01); *B60W 2420/408* (2024.01); *B60W 2520/10* (2013.01); *B60W 2554/20* (2020.02); *B60W 2554/40* (2020.02); *B60W 2554/802* (2020.02); *B60W 2720/106* (2013.01)

(56) References Cited

U.S. PATENT DOCUMENTS

| | | | | |
|---|---|---|---|---|
| 2021/0034071 | A1 | 2/2021 | Steinmeyer et al. | |
| 2021/0034072 | A1 * | 2/2021 | Max | B60W 30/10 |
| 2021/0089036 | A1 * | 3/2021 | Banzhaf | B60W 30/06 |

* cited by examiner

GENERATING AND SELECTING CANDIDATE TRAJECTORIES

CROSS-REFERENCE TO RELATED APPLICATIONS

This application claims priority as a continuation application of U.S. patent application Ser. No. 18/110,829, filed on Feb. 16, 2023, which claims the benefit of U.S. Provisional Patent Application No. 63/376,866, filed Sep. 23, 2022, the entire contents and disclosures of which are incorporated by reference in their entirety.

TECHNICAL FIELD

The present disclosure relates generally to generating one or more candidate trajectories, and more particularly, to generating and selecting one or more candidate trajectories to control a vehicle.

BACKGROUND

Vehicles with autonomous capabilities may include systems for planning and causing motion of the vehicle (or "ego vehicle") to, for example, follow a route, avoid traffic and other objects in the environment, pass another vehicle, etc. These motion planners may receive and act upon inputs from various externally facing systems, such as, for example, Light detection and ranging (LiDAR) systems, camera systems, global navigation satellite systems (GNSS), etc., which may each help generate required or desired behaviors. These required or desired behaviors may be used to generate possible maneuvers for the ego vehicle within its environment.

SUMMARY

In one embodiment, method comprises identifying, by a processor, a maximum distance bound based on one or more objects around a vehicle; for each of a plurality of candidate trajectories for the vehicle: determining, by the processor, a velocity from the maximum distance bound at an ending time of the candidate trajectory; determining, by the processor, an available distance for the candidate trajectory as a function of the determined velocity at the ending time of the candidate trajectory and a comfort deceleration parameter; determining, by the processor, a target velocity for the candidate trajectory as a function of the available distance for the candidate trajectory, a difference between a distance at the ending time of the candidate trajectory and a distance of the maximum distance bound at the ending time of the candidate trajectory, and the comfort deceleration parameter; and determining, by the processor, a velocity difference between the target velocity and a final velocity of the candidate trajectory at the ending time of the candidate trajectory; selecting, by the processor, a first candidate trajectory of the plurality of candidate trajectories based on the velocity difference of the first candidate trajectory and the velocity differences of the other candidate trajectories of the plurality of candidate trajectories; and operating, by the processor, the vehicle based on the selected first candidate trajectory.

In one embodiment, a system comprises memory and one or more processors. The one or more processors can be configured to identify a maximum distance bound based on one or more objects around a vehicle; for each of a plurality of candidate trajectories for the vehicle: determining a velocity from the maximum distance bound at an ending time of the candidate trajectory; determining an available distance for the candidate trajectory as a function of the determined velocity at the ending time of the candidate trajectory and a comfort deceleration parameter; determining a target velocity for the candidate trajectory as a function of the available distance for the candidate trajectory, a difference between a distance at the ending time of the candidate trajectory and a distance of the maximum distance bound at the ending time of the candidate trajectory, and the comfort deceleration parameter; and determining a velocity difference between the target velocity and a final velocity of the candidate trajectory at the ending time of the candidate trajectory; selecting a first candidate trajectory of the plurality of candidate trajectories based on the velocity difference of the first candidate trajectory and the velocity differences of the other candidate trajectories of the plurality of candidate trajectories; and operating the vehicle based on the selected first candidate trajectory.

In one embodiments, a method comprises identifying, by a processor, a maximum distance bound based on one or more objects around a vehicle; for each of a plurality of candidate trajectories for the vehicle: determining, by the processor, a velocity from the maximum distance bound at an ending time of the candidate trajectory; determining, by the processor, a target velocity for the candidate trajectory based on the determined velocity for the candidate trajectory and a difference between a distance at the ending time of the candidate trajectory and a distance of the maximum distance bound at the ending time of the candidate trajectory; and determining, by the processor, a velocity difference between the target velocity and a final velocity of the candidate trajectory at the ending time of the candidate trajectory; selecting, by the processor, a first candidate trajectory of the plurality of candidate trajectories based on the velocity difference of the first candidate trajectory and the velocity differences of the other candidate trajectories of the plurality of candidate trajectories; and operating, by the processor, the vehicle based on the selected first candidate trajectory.

In one embodiment, a method of evaluating one or more candidate trajectories comprises: generating one or more maximum distance bounds based on the required or desired behaviors; consolidating the one or more generated maximum distance bounds into a consolidated maximum distance bound; converting the consolidated maximum distance bound to a derived velocity based on a slope of the consolidated maximum distance bound at a given point in time; using the derived velocity as a factor in determining one or more target velocities for one or more candidate trajectories, wherein each target velocity is determined based on comparing the sum of: (i) a distance from the consolidated maximum distance bound to a trajectory distance; and (ii) an available distance as determined from a comparison between the derived velocity and a comfort deceleration curve, to the comfort deceleration curve, and comparing the one or more target velocities to a consolidated maximum velocity bound to evaluate the one or more target velocities, and comparing the lowest of the target velocities to the trajectory velocity for each of the candidate trajectories.

In another embodiment, a system for generating and selecting one or more candidate trajectories includes a processor; a memory communicatively coupled to the processor and storing one or more machine-readable instructions that, when executed by the processor, cause the system to perform operations comprising: generating one or more maximum distance bounds based on the required or desired behaviors; consolidating the one or more generated maximum distance bounds into a consolidated maximum distance bound; converting the consolidated maximum distance bound to a derived velocity based on a slope of the consolidated maximum distance bound at a given point in time; using the derived velocity as a factor in determining one or more target velocities for one or more candidate trajectories, wherein each target velocity is determined based on comparing the sum of: (i) a distance from the consolidated maximum distance bound to a trajectory distance; and (ii) an available distance as determined from a comparison between the derived velocity and a comfort deceleration curve, to the comfort deceleration curve, and comparing the one or more target velocities to a consolidated maximum velocity bound to evaluate the one or more target velocities, and comparing the lowest of the target velocities to the trajectory velocity for each of the candidate trajectories.

In another embodiment, a method of evaluating one or more minimum jerk trajectories for suitability for use by an ego vehicle, the method includes generating one or more minimum jerk trajectories, each minimum jerk trajectory comprising a trajectory distance and trajectory velocity and duration; comparing the trajectory distance to a consolidated maximum distance bound; determining an available distance based on a slope of the consolidated maximum distance bound; using the available distance and a distance between the consolidated maximum distance bound and the trajectory distance to determine a total distance; and using the total distance to determine a target velocity based on a comfort deceleration curve.

In another embodiment, a method comprises identifying, by a processor, a maximum distance bound and a maximum velocity bound based on one or more objects around a vehicle; for each of a plurality of candidate trajectories: deriving, by the processor, a velocity by calculating a slope of the maximum distance bound at an ending time of the candidate trajectory; determining, by the processor, an available distance for the candidate trajectory by comparing the derived velocity with a comfort deceleration curve; determining, by the processor, a target velocity for the candidate trajectory by comparing a sum of (i) the available distance, and (ii) a distance between a distance at the ending time of the candidate trajectory and a distance of the maximum distance bound at the ending time of the candidate trajectory, with the comfort deceleration curve; and calculating, by the processor, a velocity difference between the target velocity and the derived velocity; selecting, by the processor, a first candidate trajectory of the plurality of candidate trajectories based on the velocity difference of the first candidate trajectory compared with the velocity differences of the other candidate trajectories of the plurality of candidate trajectories; and operating, by the processor, the vehicle based on the selected first candidate trajectory.

In another embodiment, a system comprises memory; and one or more processors. The one or more processors can be configured to identify a maximum distance bound and a maximum velocity bound based on one or more objects around a vehicle; for each of a plurality of candidate trajectories derive a velocity by calculating a slope of the maximum distance bound at an ending time of the candidate trajectory; determine an available distance for the candidate trajectory by comparing the derived velocity with a comfort deceleration curve; determine a target velocity for the candidate trajectory by comparing a sum of (i) the available distance, and (ii) a distance between a distance at the ending time of the candidate trajectory and a distance of the maximum distance bound at the ending time of the candidate trajectory, with the comfort deceleration curve; and calculate a velocity difference between the target velocity and the derived velocity; select a first candidate trajectory of the plurality of candidate trajectories based on the velocity difference of the first candidate trajectory compared with the velocity differences of the other candidate trajectories of the plurality of candidate trajectories; and operate the vehicle based on the selected first candidate trajectory.

In another embodiment, a method of evaluating one or more minimum jerk trajectories for suitability for use by an ego vehicle is disclosed. The method may comprise generating one or more minimum jerk trajectories, each minimum jerk trajectory comprising a trajectory distance and trajectory velocity and duration; comparing the trajectory distance to a consolidated maximum distance bound to determine a difference between the trajectory distance and the consolidated maximum distance bound; determining an available distance based on a slope of the consolidated maximum distance bound; using the available distance and the difference between the trajectory distance and the consolidated maximum distance bound to determine a total distance; and using the total distance to determine a target velocity based on a comfort deceleration curve.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

DETAILED DESCRIPTION

Figure 1:
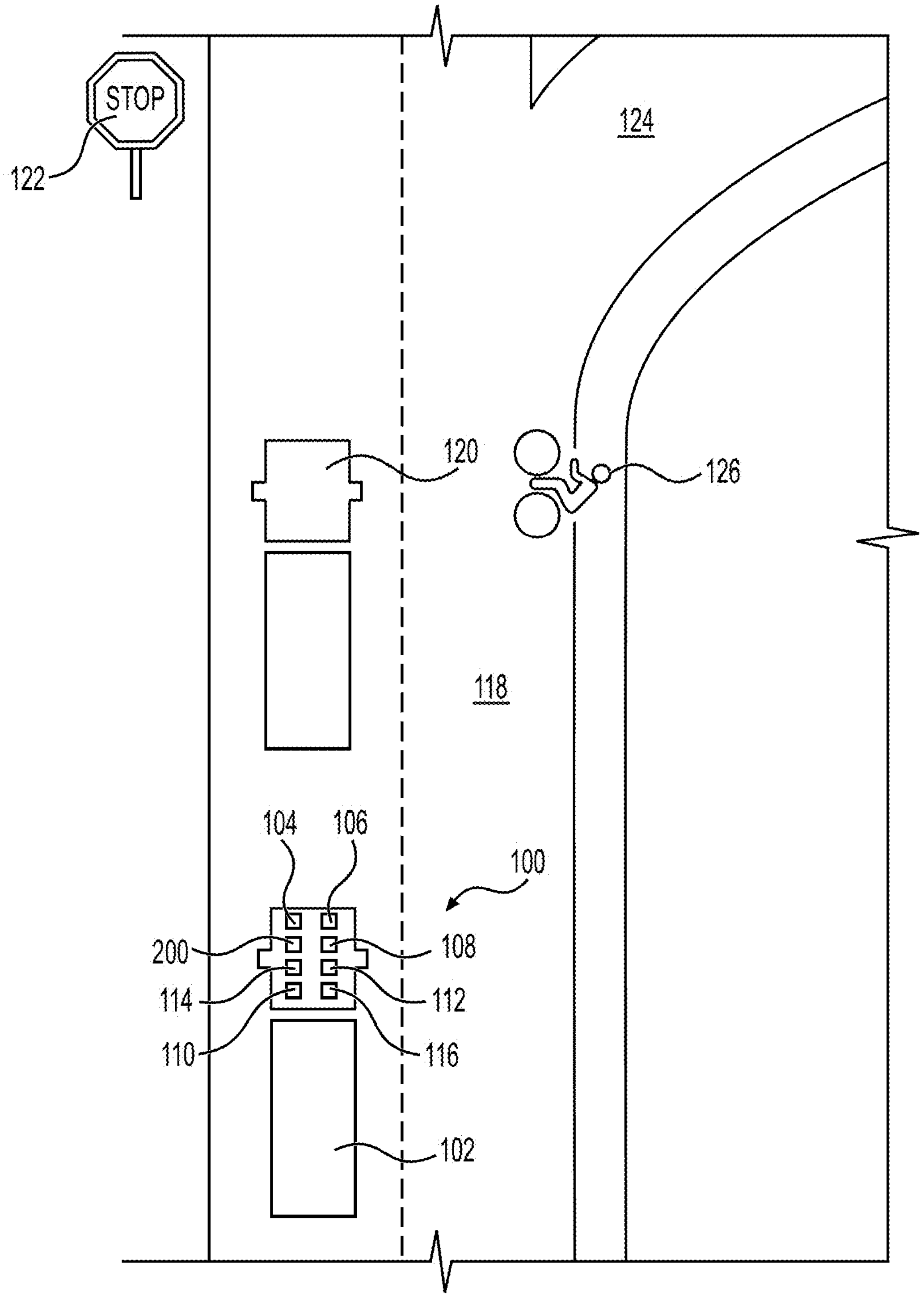
FIG. 1 depicts a schematic illustration including a bird's eye view of a vehicle traveling along a roadway including a system for generating and selecting candidate trajectories, according to an embodiment.

Both the foregoing general description and the following detailed description are explanatory only and are not restrictive of the features, as claimed. As used herein, the terms "comprises," "comprising," "has," "having," "includes,"

"including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a variety of different configurations, all of which are contemplated herein.

Autonomous vehicle virtual driver systems are structured on three pillars of technology: 1) perception, 2) maps/localization, and 3) behaviors planning and control. The mission of perception is to sense an environment surrounding an ego vehicle and interpret it. To interpret the surrounding environment, a perception engine may identify and classify objects or groups of objects in the environment. For example, an autonomous system may use a perception engine to identify one or more objects (e.g., pedestrians, vehicles, debris, etc.) in the road before a vehicle and classify the objects in the road as distinct from the road. The mission of maps/localization is to figure out where in the world, or where on a pre-built map, is the ego vehicle. One way to do this is to sense the environment surrounding the ego vehicle (e.g., perception systems) and to correlate features of the sensed environment with details (e.g., digital representations of the features of the sensed environment) on a digital map. Once the systems on the ego vehicle have determined its location with respect to the map features (e.g., intersections, road signs, etc.) the ego vehicle (or just "ego") can plan maneuvers and/or routes with respect to the features of the environment. The mission of behaviors, planning, and control is to make decisions about how the ego should move through the environment to get to its goal or destination. It consumes information from the perception engine and the maps/localization modules to know where it is relative to the surrounding environment and what other traffic actors are doing.

Autonomous vehicle behaviors planning and control may be responsible for decision making to ensure, for example, the vehicle follows rules of the road and interacts with other aspects and features in the surrounding environment (e.g., other vehicles) in a manner that would be expected of, for example, a human driver. The behavior planning may achieve this using a number of tools including, for example, goal setting (local/global), implementation of one or more bounds, virtual obstacles, and using other tools. Some planners may use, for example, sampling based planning in which a number of feasible trajectory paths may be generated and sampled, which may be verified through one or more processes, such as, for example, collision checking. Feasible trajectory paths can be most complicated when accounting for dynamic objects (e.g., oncoming or parallel traffic, cyclists, etc.) in the environment, which dynamic objects may necessitate consideration of both space and time dimensions. Further, future dynamic object trajectories may be impossible to determine, especially with respect to human-controlled dynamic objects, which may act according to varying levels of expected, customary, or rational behavior. Dynamic objects, especially human-controlled ones, may thus require specifically conservative behavior(s) on the part of a vehicle controlled using one or more autonomous capabilities. Autonomous capabilities may be implemented through the generation and selection of motion trajectories. Hence, one of the most difficult and important jobs of the behaviors and control system is the generation of trajectories, which can be ultimately passed on for use by motion control.

Trajectories planned for vehicles with human passengers must be safe, dynamically feasible, comfortable and customizable according to individual needs of the autonomous-capable vehicle and/or its occupants. As stated, the most important requirement related to a trajectory is perhaps that it cannot lead to collision with static or dynamic obstacles and as the planning problem is very complex, it is difficult to handle all of the requirements simultaneously. Factoring in dynamic feasibility complicates further complicates the problem. Dynamic feasibility refers to the capability of the ego vehicle to complete a trajectory. Planning a trajectory for 100 m/s may not be viable if an ego vehicle can only travel at a maximum speed of 29 m/s. And it follows that dynamical feasibility is related to safety, because the generation and attempted completion of implausible or impossible trajectories can lead to hazardous situations.

Viable candidate trajectories can be generated and selected in a number of ways. Selection methods may use, for example, a distance bound (i.e., a maximum or minimum instantaneous distance from ego vehicle v. time) to calculate and select candidate trajectories. Some candidate trajectory selection methods may result in suboptimal vehicle positioning, however, because they may not account for the distance past a dynamic distance bound (that is, a distance bound with a positive slope when graphed vs. time) that also contributes to the drivable space between an ego vehicle and one or more dynamic objects in the ego's environment. By accounting for this additional distance, an optimal candidate trajectory can be selected which minimizes the distance between an ego vehicle's current position and where it could be based on the static and dynamic objects and restrictions in the ego vehicle's environment. Minimizing this distance, and accounting for other factors, allows the ego vehicle to operate at the maximum safe velocity, thus minimizing mission completion times while not subjecting the vehicle or its occupants or cargo to danger.

FIG. 1 illustrates a system 100 for selecting a candidate trajectory on a vehicle 102. The vehicle 102 may include various autonomous functionality (e.g., any autonomy level 1-5) and may include, for example, a virtual driver, an advanced driver assistance system (ADAS), and/or other autonomous and autonomous-capable systems or components. The vehicle 102 can be an ego vehicle. The ADAS system or other autonomous functions on the vehicle 102 may utilize data generated by the various sensing systems (e.g., camera, LiDAR, radar, etc.) and systems of the vehicle configured to communicate with external systems or networks (e.g., GNSS, mapping systems, etc.) on the vehicle to perform the one or more autonomous functions. The vehicle 102 depicted in FIG. 1 is a truck (i.e., a tractor trailer), but it is to be understood that the vehicle 102 could be any type of vehicle including a car, a mobile machine, etc. The vehicle 102 includes a controller 200 that may be communicatively coupled to a camera system 104, a LiDAR system 106, a GNSS 108, an inertial measurement unit (IMU) 110, a transceiver 112, an object node 114, and a mapping node

116. In some embodiments, the object node 114 and the mapping node 116 may be components of or modules on the controller 200.

As depicted in FIG. 1, the vehicle 102 drives down a roadway 118 following a subject vehicle 120. The vehicle 102 and the subject vehicle 120 are approaching a ramp 124 that provides an exit from the roadway 118. Also utilizing the roadway 118 is a cyclist 126. The vehicle 102 is approaching a stop sign 122, which stop sign may serve as a "stop line" for the autonomous behavioral planning modules described in greater detail herein. As used herein, a stop line is a location at which the behavioral planning modules "know" the vehicle cannot pass without safely coming to a complete stop such that one or more of the behavioral planning modules will generate trajectories which stop the vehicle at the stop line.

Each of the features in the environment surrounding the vehicle 102 may be perceived or otherwise known to the vehicle 102 (e.g., based on a perception engine including one or more of the perceptive systems described herein) and may affect the behavior planning of the vehicle 102. For example, the cyclist 126 may be perceived by one or more sensors aboard the vehicle 102 (e.g., the camera system 104, the LiDAR system 106, etc.) and may be classified (e.g., by one or more modules in the controller 200) such that the vehicle's behavioral planning modules can develop one or more trajectories accounting for the presence of the cyclist 126 as described in greater detail herein.

Generally speaking, a trajectory is mathematical representation of a proposed motion for the ego vehicle to carry out via one or more of its vehicle control systems (e.g., propulsion, throttle, steering, brakes, etc.) which is confined to some time interval. Trajectories are generated and selected by the vehicle's motion planning systems. The vehicle may routinely generate and select trajectories to carry out its motion as it drives along the roadway 118. Trajectories may be generated, for example, based on necessary or desirable motions of the vehicle (e.g., stop at a stop sign, accelerate to pass another vehicle, etc.) Candidate trajectories can be generated and selected based on information developed from external sensors and/or generated and selected based on vehicle characteristics, such as, for example, maximum speed, acceleration, steering, and steering rate. Sensor based candidate trajectories, for example, may integrate the perception of the environment (e.g., based on input from the camera system 104, the LiDAR system 106, etc.). Vehicle-dynamics based candidate trajectories and model based optimization methods for trajectory generation (e.g., gradient descent-based methods, model predictive control, etc.) may account for the particular aspects of vehicle motion and constraints thereon (e.g., maximum speed, turning radius, etc.). These aspects and constraints can be stored, for example, in one or more modules on the controller 200 (e.g., a memory module). The motions and constraints of the vehicle 102 itself may themselves be dynamic (e.g., the vehicle's maximum turn radius may decrease with increasing speed). Additionally, feasibility must be accounted for when generating and selecting trajectories.

Figure 2:
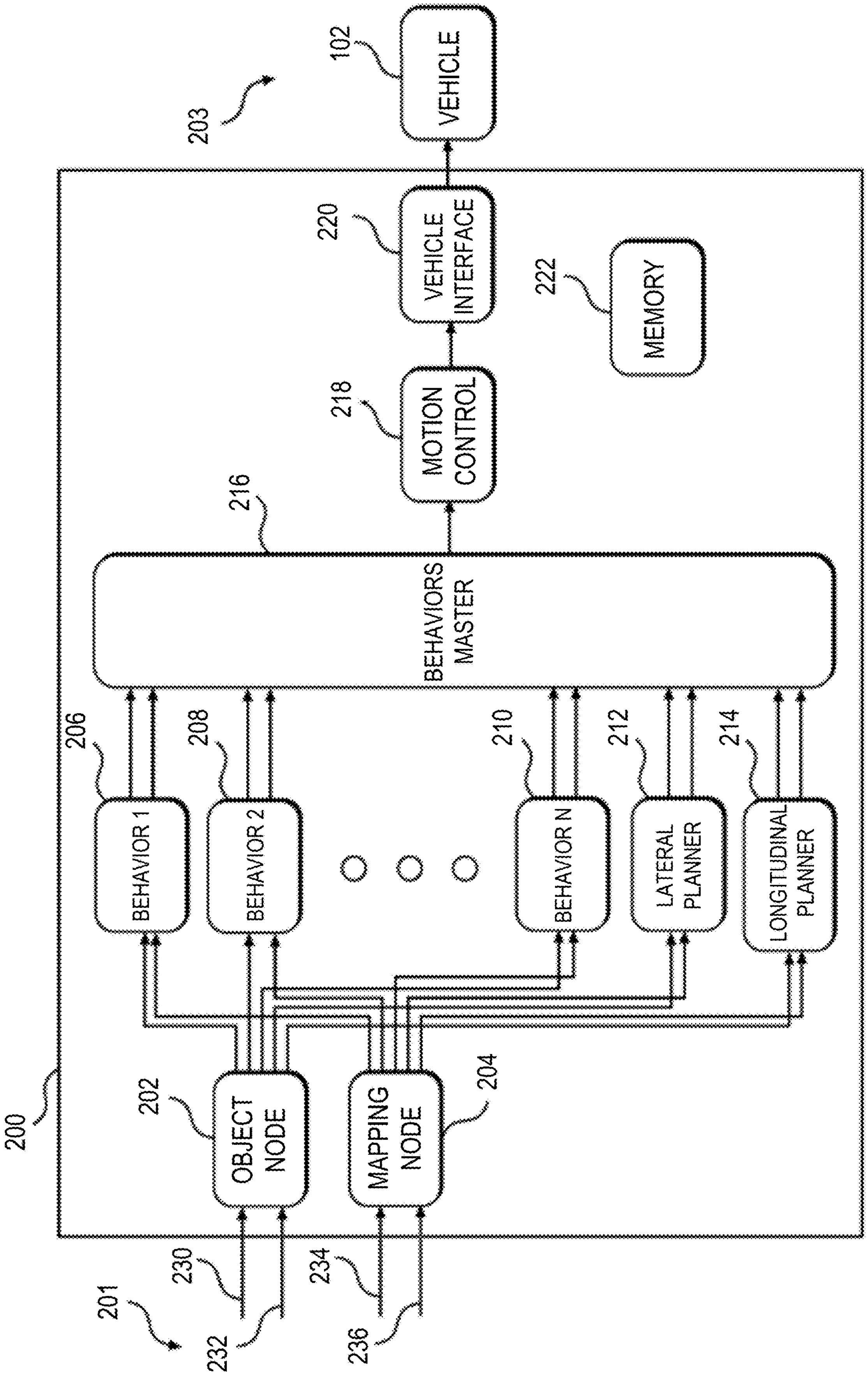
FIG. 2 depicts a controller for generating and selecting a candidate trajectory, according to an embodiment.

Still referring to FIG. 1, the controller 200, which is described in greater detail herein, especially with respect to FIG. 2, is configured to receive an input(s) from and provide an output(s) to various other systems or components of the system 100. For example, the controller 200 may receive visual system data from the camera system 104, LiDAR system data from the LiDAR system 106, GNSS data from the GNSS 108, external system data from the transceiver 112, and IMU system data from the IMU 110.

The camera system 104 may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102, to the sides of the vehicle 102, etc.) or may surround 360 degrees of the vehicle 102. In some embodiments, the vehicle 102 includes multiple cameras and the images from each of the multiple cameras may be stitched to generate a visual representation of the multiple cameras' fields of view, which may be used to, for example, generate a bird's eye view of the environment surrounding the vehicle 102 (similar to that depicted in FIG. 1). In some embodiments, the image data generated by the camera system(s) 104 may be sent to the controller 200 and/or other aspects of the system 100 and this image data may include the vehicle 102 or a generated representation of the vehicle 102. In some embodiments, one or more systems or components of the system 100 may overlay labels to the features depicted in the image data, such as on a raster layer or other semantic layer of an HD map.

The LiDAR system 106 generally includes a laser generator and a detector and can send and receive a LiDAR signal. The LiDAR signal can be emitted and received from any direction such that LiDAR point clouds (or "LiDAR images") of the areas ahead of, to the side, and behind the vehicle 102 can be captured and represented in the LiDAR point clouds. In some embodiments, the vehicle 102 includes multiple LiDAR lasers and sensors and the LiDAR point clouds from each of the multiple LiDAR sensors may be stitched to generate a LiDAR-based representation of the area covered by the LiDAR signal(s). In some embodiments, the LiDAR point cloud(s) generated by the LiDAR sensors and sent to the controller 200 and other aspects of the system 100 may include the vehicle 102. In some embodiments, the system inputs from the camera system 104 and the LiDAR system 106 may be fused.

Figure 3:
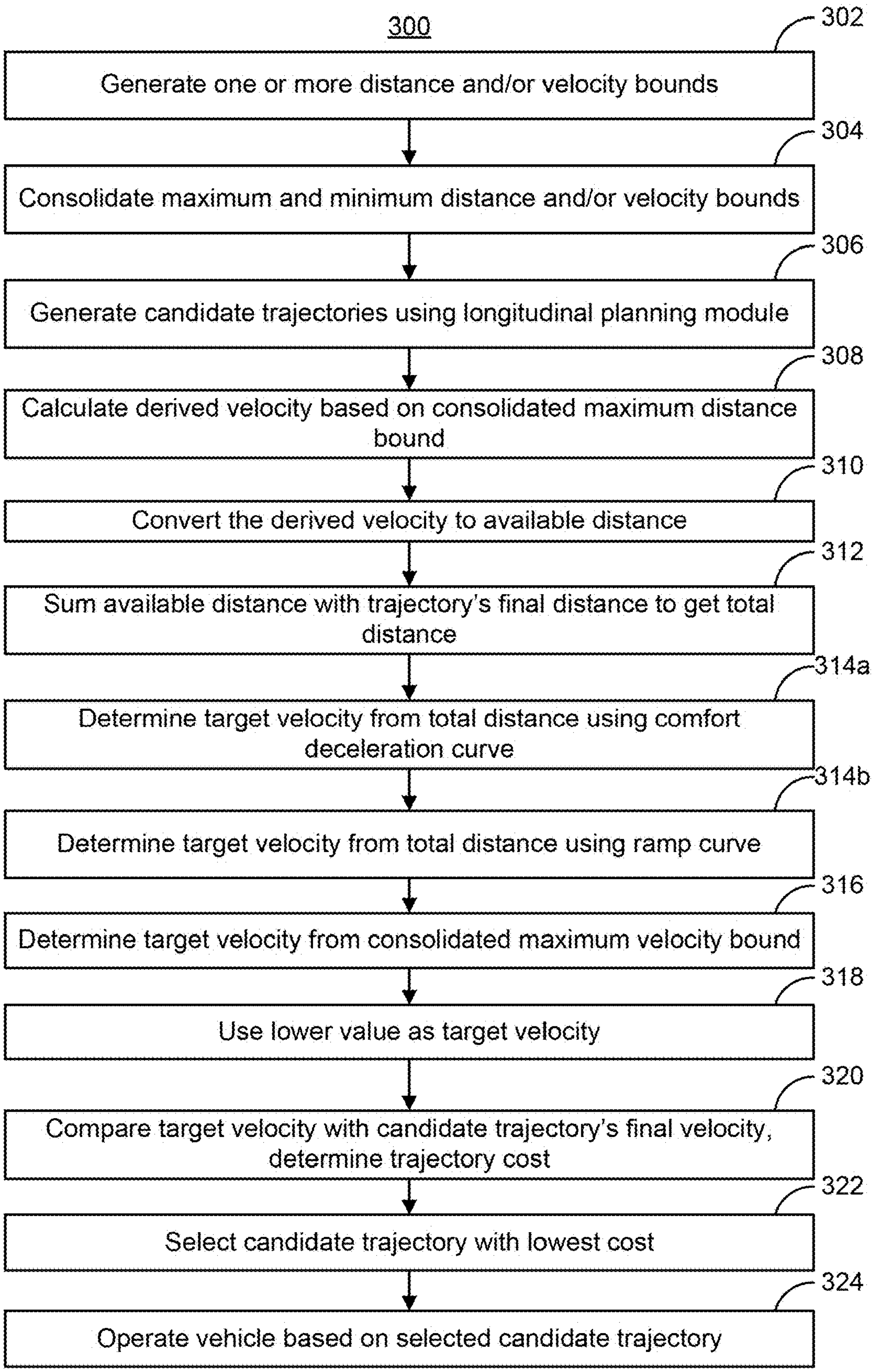
FIG. 3 depicts a method for generating and evaluating a candidate trajectory using a system, according to an embodiment.

The GNSS 108 may be positioned on the vehicle 102 and may be configured to determine a location of the vehicle 102, which it may embody as GNSS data, as described herein, especially with respect to FIG. 3. The GNSS 108 may be configured to receive one or more signals from a global navigation satellite system (GNSS) (e.g., GPS system) to localize the vehicle 102 via geolocation. In some embodiments, the GNSS 108 may provide an input to or be configured to interact with, update, or otherwise utilize one or more digital maps, such as an HD map (e.g., in a raster layer or other semantic map). In some embodiments, the GNSS 108 is configured to receive updates from the external network (e.g., via a GNSS/GPS receiver (not depicted), the transceiver 112, etc.). The updates may include one or more of position data, speed/direction data, traffic data, weather data, or other types of data about the vehicle 102 and its environment.

The transceiver 112 may be configured to communicate with an external network via, for example, a wired and/or wireless connection. In embodiments, comprising a wireless connection the connection may be a wireless communication signal (e.g., Wi-Fi, cellular, LTE, 5g, etc.). However, in some embodiments, the transceiver 112 may be configured to communicate with an external network via a wired connection, such as, for example, during testing or initial installation of the system 100 to the vehicle 102. The connection(s)

may be used to download and install various lines of code in the form of digital files (e.g., HD maps), executable programs (e.g., navigation programs), and other computer-readable code that may be used by the system 100 to navigate the vehicle 102 or otherwise operate the vehicle 102, either autonomously or semi-autonomously. The digital files, executable programs, and other computer readable code may be stored locally or remotely and may be routinely updated (e.g., automatically or manually) via the transceiver 112 or updated on demand. In some embodiments, the vehicle 102 may deploy with all of the data it needs to complete a mission (e.g., perception, localization, and mission planning) and may not utilize a wireless connection or other connection while underway.

The IMU 110 may be an electronic device that measures and reports one or more features regarding the motion of the vehicle 102. For example, the IMU 110 may measure a velocity, acceleration, angular rate, and or an orientation of the vehicle 102 or one or more of its individual components using a combination of accelerometers, gyroscopes, and/or magnetometers. The IMU 110 may detect linear acceleration using one or more accelerometers and rotational rate using one or more gyroscopes. In some embodiments, the IMU 110 may be communicatively coupled to one or more other systems, for example, the GNSS 108 and may provide an input to and receive an output from the GNSS 108, which may allow the GNSS 108 to continue to predict a location of the vehicle 102 even when the GNSS 108 cannot receive satellite signals.

Referring now to FIG. 2, the controller 200 is depicted in greater detail. The controller 200 may receive inputs 201 and generate outputs 203. The controller 200 may include an object node 202, a mapping node 204, a series of behavioral modules including a first behavior module 206, a second behavior module 208, and an nth behavior module 210, a lateral planner 212, a longitudinal planner 214, a behaviors master module 216, a motion control module 218, and a vehicle interface module 220 for interfacing with the vehicle 102 of FIG. 1. The controller 200 may also include a memory 222. The controller 200 may receive, for example, camera system data 230 from the camera system 104, LiDAR system data 232 from the LiDAR system 106, GNSS data 234 from the GNSS 108, and IMU system data 236 from the IMU 110. In some embodiments, the controller 200 and one or more of its components may receive external system data from the transceiver 112.

The controller 200 may comprise a data processor, a microcontroller, a microprocessor, a digital signal processor, a logic circuit, a programmable logic array, or one or more other devices for controlling the system 100 in response to one or more of the inputs 201. Controller 200 may embody a single microprocessor or multiple microprocessors that may include means for trajectory generation. For example, the controller 200 may include a memory, a secondary storage device, and a processor, such as a central processing unit or any other means for accomplishing a task consistent with the present disclosure. The memory or secondary storage device associated with controller 200 may store data and/or software routines that may assist the controller 200 in performing its functions, such as the functions of the method 300 described herein with respect to FIG. 3. Further, the memory or secondary storage device associated with the controller 200 may also store data received from various inputs associated with the system 100. Numerous commercially available microprocessors can be configured to perform the functions of the controller 200. It should be appreciated that controller 200 could readily embody a general machine controller capable of controlling numerous other machine functions. Alternatively, a special-purpose machine controller could be provided. Further, the controller 200, or portions thereof, may be located remote from the system 100. Various other known circuits may be associated with the controller 200, including signal-conditioning circuitry, communication circuitry, hydraulic or other actuation circuitry, and other appropriate circuitry.

The memory 222 may store software-based components to perform various processes and techniques described herein of the controller 200, including the various behavior modules, the lateral planner, and the longitudinal planner. The memory 222 may store one or more machine readable and executable software instructions, software code, or executable computer programs, which may be executed by a processor of the controller 200. The software instructions may be further embodied in one or more routines, subroutines, or modules and may utilize various auxiliary libraries and input/output functions to communicate with other equipment, modules, or aspects of the system 100.

As mentioned above, the controller 200 may include various behavior planning modules (which may be stored, for example, in the memory 222), such as, for example, the first behavior module 206, the second behavior module 208, and the nth behavior module 210 (collectively referred to as "the behavior modules"). The behavior modules may handle planning for (e.g., planning to take one or more actions) various aspects of the environment surrounding the vehicle 102. The behavior modules may do so, for example, based on static and dynamic objects (e.g., traffic, speed bumps, road signs, cyclists, etc.), traffic control features (e.g., road signs, road signals, lane markings, etc.), and other aspects of the environment. The behavioral planning modules may output, for example, controller directives such as lateral and longitudinal driving bias, aggressiveness of distance keeping from various obstacles or other traffic, maximum and minimum speed, maximum and minimum acceleration, etc. The behaviors modules may receive data from one or more of a perception engine, a localization system, and other components of the behaviors planning and control system. For example, the behaviors modules may receive image data captured by one or more the camera system 104 or the LiDAR system 106, which may have been processed or filtered by one or more other components of the system 100. The behaviors modules can use image processing techniques or other object identification techniques to identify static (e.g., stationary) and/or dynamic (e.g., moving) objects in the area around (e.g., surrounding and/or in view by the data capturing system or systems of camera system 104 or the LiDAR system 106) the vehicle. In doing so, the behaviors modules can identify that the objects exist, the proximity (e.g., the distance of the objects from the vehicle 102, and/or what the objects are (e.g., the types of the objects). In some embodiments, the behavior planning modules may receive localization data from components which localize the vehicle 102 (i.e., determine its own location), which data may be processed and/or filtered, and may use localization data to calculate one or more trajectories based on the present location of the vehicle. The localization data may include, for example, a location (e.g., absolute (lat/long) or relative with respect to one or more external objects/features as determined from a digital map (e.g., HD map)). The behavioral planning modules may generate space constraints for viable trajectories and the lateral and longitudinal planners may generate trajectories within those constraints for implementation by the vehicle 102 as described in greater detail herein.

The lateral planner 212 and the longitudinal planner 214 (collectively "planning modules") may plan lateral motion and longitudinal motion, respectively, as a desired trajectory of the vehicle 102. The desired trajectory may include, for example, both a desired path and speed. The planning modules may consider kinematic static and dynamic constraints of the vehicle, as well as all moving and static obstacles. The planning modules may consider, for example, inputs from the various behavioral modules described herein when considering kinematic, static and dynamic constraints. The planning modules may plan motion of the vehicle over any planning horizon. The planning modules may concatenate multiple layers of trajectories to produce a plan with one or more near to distant planning horizons and search for multiple candidate trajectories within the constraints provided by the behavioral modules, for instance. The planning modules may interact with one another and the other various modules of the system in a hierarchical autonomous vehicle architecture or a parallel autonomous vehicle architecture and may comprise one or more dedicated sensors.

The behaviors master module 216 may be an aggregator of signals and information from the various behavior modules (1-n) and may receive and send signals between the various behaviors modules and the lateral planner 212 and the longitudinal planner 214. Through the behaviors master module 216, all of the behaviors modules and the lateral planner 212 and the longitudinal planner 214 can communicate with one another.

The motion control module 218 may generate and send motion control signals to the vehicle interface module 220. The vehicle interface module 220 may, for example, send one or more signals to the various aspects of the vehicle 102 which actually control the motion of the vehicle (e.g., engine, throttle, steering wheel, brakes, etc.)

The disclosed aspects of the system 100 of the present disclosure may be used to grade various candidate trajectories for longitudinal planning, which may be constrained by various behavior modules, against one another to determine an optimal candidate trajectory.

FIG. 3 shows a method 300 for generating one or more candidate trajectories and choosing a trajectory for motion control of a vehicle (e.g., an ego vehicle), using one or more components of the system 100 shown in FIGS. 1 and 2. At step 302, the process may begin by generating one or more distance and/or velocity bounds. The one or more distance and velocity bounds may be generated by, for example, the behavior modules of the controller 200. The behavior modules may generate one or more maximum and/or minimum distance bounds (collectively referred to as "distance bounds") and/or one or more maximum and/or minimum velocity bounds (collectively referred to as "velocity bounds") (the distance bounds and the velocity bounds may be collectively referred to as "generated bounds"). Each of the four bounds from each of the behavior modules can be populated or empty in any combination for a given planning cycle.

The generated bounds may be generated in the various behaviors modules and may be based on the various inputs to the individual modules (e.g., camera system data, LiDAR system data, GNSS data, etc.). For example, the vehicle 102 may include a "stop line" behavior module (that is, one of the n behavior modules), which may generate stop lines based on, for example, stop signs known to the vehicle based on the inclusion of the stop sign in a raster layer of an HD map, which HD map may have been uploaded to the system before the vehicle 102 began its mission. Another example of a behavior module includes, for example, an adaptive cruise control module which may generate a dynamic maximum distance bound based on keeping a safe distance from the vehicle 120 in front of the vehicle 102 based on detecting the lead vehicle 120 using the sensing systems aboard the vehicle 102. Each of the behaviors modules may generate its own bound(s) and the bound(s) may be correlated as described herein.

Figure 4A:
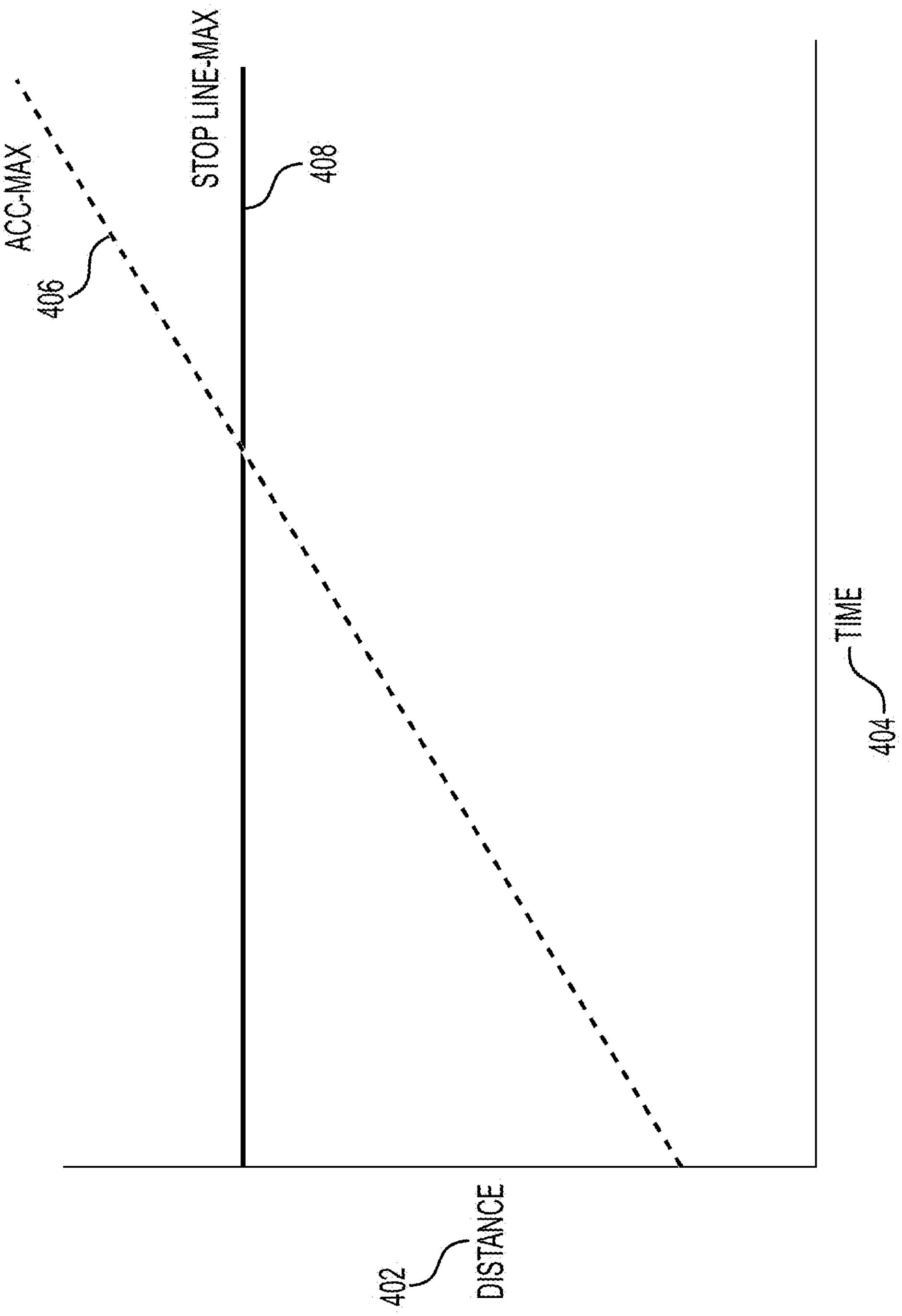
FIG. 4A depicts a chart showing distance bounds generated by a system for generating and selecting candidate trajectories, according to an embodiment.
Figure 4B:
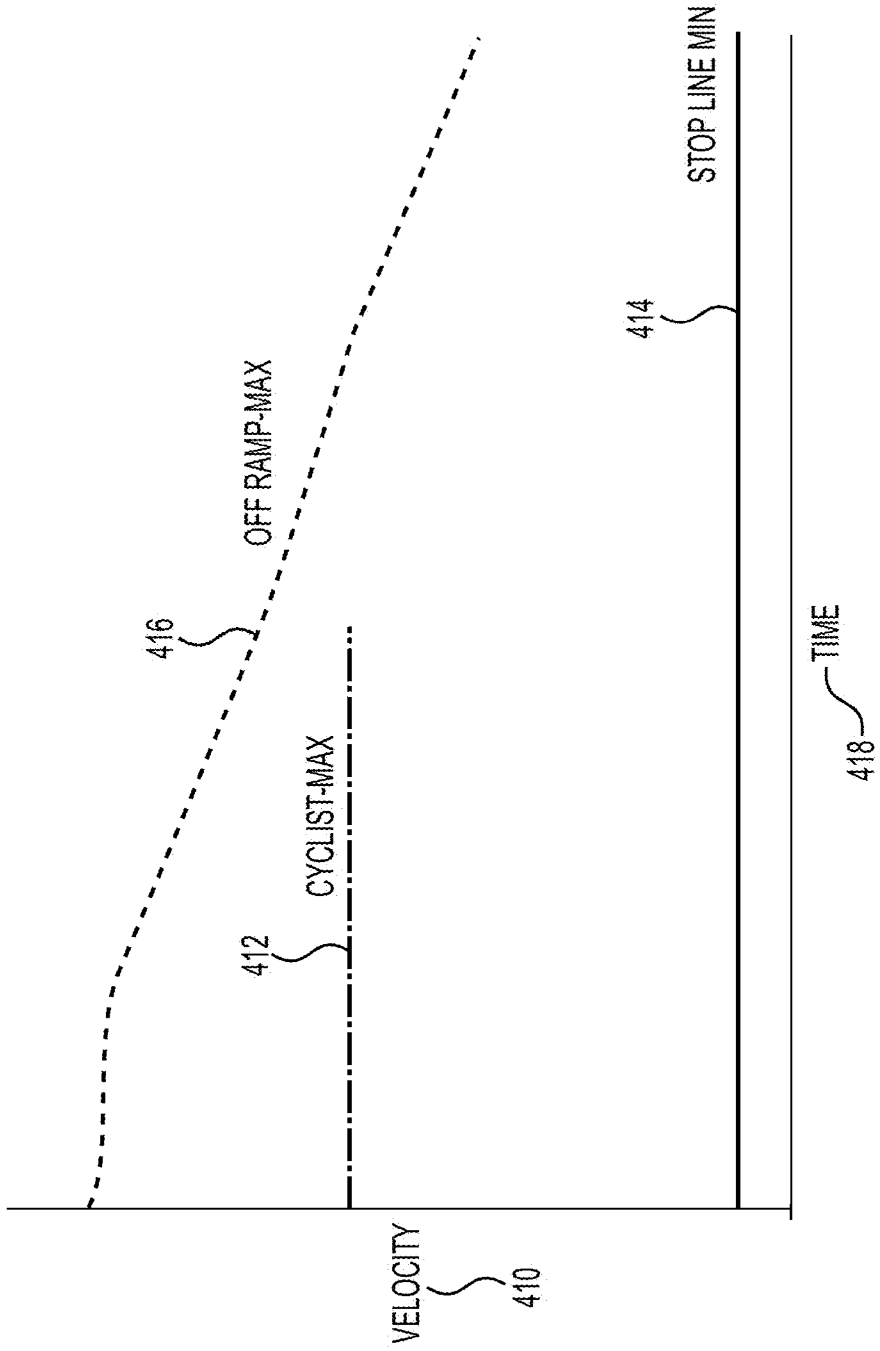
FIG. 4B depicts a chart showing velocity bounds generated by a system for generating and selecting candidate trajectories, according to an embodiment.

FIGS. 4A and 4B show bounds generated based on the scenario depicted in FIG. 1. The bounds are generated based on operation of the system 100 with respect to the environment and the objects surrounding the vehicle 102. The environment includes both static objects and aspects (e.g., the stop sign 122, the off ramp 124) and dynamic objects and aspects (e.g., the vehicle 120, the cyclist 126). The system 100 may account for the various objects in the environment and constantly plan lateral and longitudinal trajectories based on the objects and features in the environment and the inputs to the controller that may be based on those objects and aspects of the environment. For example, the system 100 may plan longitudinal trajectories based on the upcoming stop sign 122 as determined based on: 1) detecting the stop sign 122 with the camera system 104 and/or LiDAR system 106 and/or 2) based on an input from a GNSS 108 and an HD map which indicates to the vehicle 102 the location of the stop sign 122. The vehicle 102 may similarly detect the cyclist 126 using the camera system 104 and/or LiDAR system 106 and may classify the cyclist using one or more object classification algorithms in one or more of the various modules of the vehicle 102 (e.g., using machine vision and labeled cyclist image data, for instance). The detection and classification of the cyclist 126 may then serve as an input to one or more of the n behaviors modules. Similarly, the vehicle 102 may determine behaviors for the vehicle 120 and the off ramp 124.

FIG. 4A shows a chart with instantaneous distance bounds generated by different behavior planning modules based on the scenario of FIG. 1. The plot shows a distance 402 versus a time 404. The adaptive cruise control module (one of the n behavior modules from FIG. 2) generates a maximum distance bound 406 that is based on a velocity and position of the vehicle 120. Because the vehicle 120 moves forward along the roadway 118, the maximum distance over time the vehicle 102 can travel is based on the expected movement of the vehicle 120. That is, as the vehicle 120 continues along its path on roadway 118, it will continue to get further and further from the instantaneous position of the vehicle 102. Accordingly, the maximum distance bound 406 increases with respect to time. The expected position/trajectory of the vehicle 120 may be calculated separately and serve as an input to the adaptive cruise control behavior module based on, for example, inputs from the LiDAR system, camera system, transceiver, and/or one or more other systems. The stop line maximum distance bound 408 may be flat, as it represents a maximum distance the vehicle 102 can travel based on the stop sign 122. That is, at the instantaneous time the distance bound 408 is calculated, the stop sign relates to a maximum distance before the vehicle 102 must stop. The location of the stop sign 122 and thus the position of the distance bound 408 may be determined by the vehicle 102 based on a signal from, for example, the GNSS 108 and an HD map.

FIG. 4B shows a chart with instantaneous velocity bounds generated by different behavior planning modules based on the scenario in FIG. 1. The plot shows an instantaneous velocity profile 410 for some amount of time 418. The cyclist behavior module (one of the n behavior modules of FIG. 2) generates a maximum velocity bound 412 based on the cyclist 126 of FIG. 1. The maximum instantaneous velocity may be based, for example, on a programmed behavior of maintaining a maximum velocity (which may be programmed to be a relatively low velocity) in the presence of a cyclist. Additionally, the stop line behavior module (one of the n behavior modules of FIG. 2) may generate a stop line minimum instantaneous velocity 414. The minimum instantaneous velocity 414 may be based on not wanting to come to a complete stop until the vehicle 102 reaches the stop sign 122, for example. A maximum instantaneous velocity curve 416 may be based on the vehicle's 102 relative location to the off ramp 124, which location of may be determined based on, for example, signals from the GNSS 108 and/or IMU 110 and a digital map, such as an HD map. The maximum instantaneous velocity curve 416 may account for the curvature of the off ramp 124, which may require a reduction in a maximum safe speed as the vehicle would travel along the ramp 124 based on the vehicle utilizing the off ramp 124 (even though the vehicle 102 may not eventually utilize a route taking the off ramp 124). Hence, the allowed velocity for the vehicle 102, if it were to travel along the off ramp 124 from its current location shown in FIG. 1, would decrease over time.

At step 304, the system 100 may consolidate the maximum and minimum bounds generated at step 302 into a most restricted maximum distance and velocity bounds and most restricted minimum distance and velocity bounds, respectively. The most restricted maximum distance bound may be a consolidated distance line (i.e., instantaneous distance over time) which uses the lowest of each of the maximum distance bounds generated by the various behavior modules. The most restricted minimum distance bound may be a consolidated distance line (i.e., instantaneous distance over time) which uses the highest of each of the minimum distance bounds generated by the various behavior modules. The most restricted maximum velocity bound may be a consolidated velocity line (i.e., instantaneous velocity over time) which uses the lowest of each of the maximum velocity bounds generated by the various behavior modules. The most restricted minimum velocity bound may be a consolidated velocity line (i.e., instantaneous velocity over time) which uses the highest of each of the minimum velocity bounds generated by the various behavior modules.

Figure 5A:
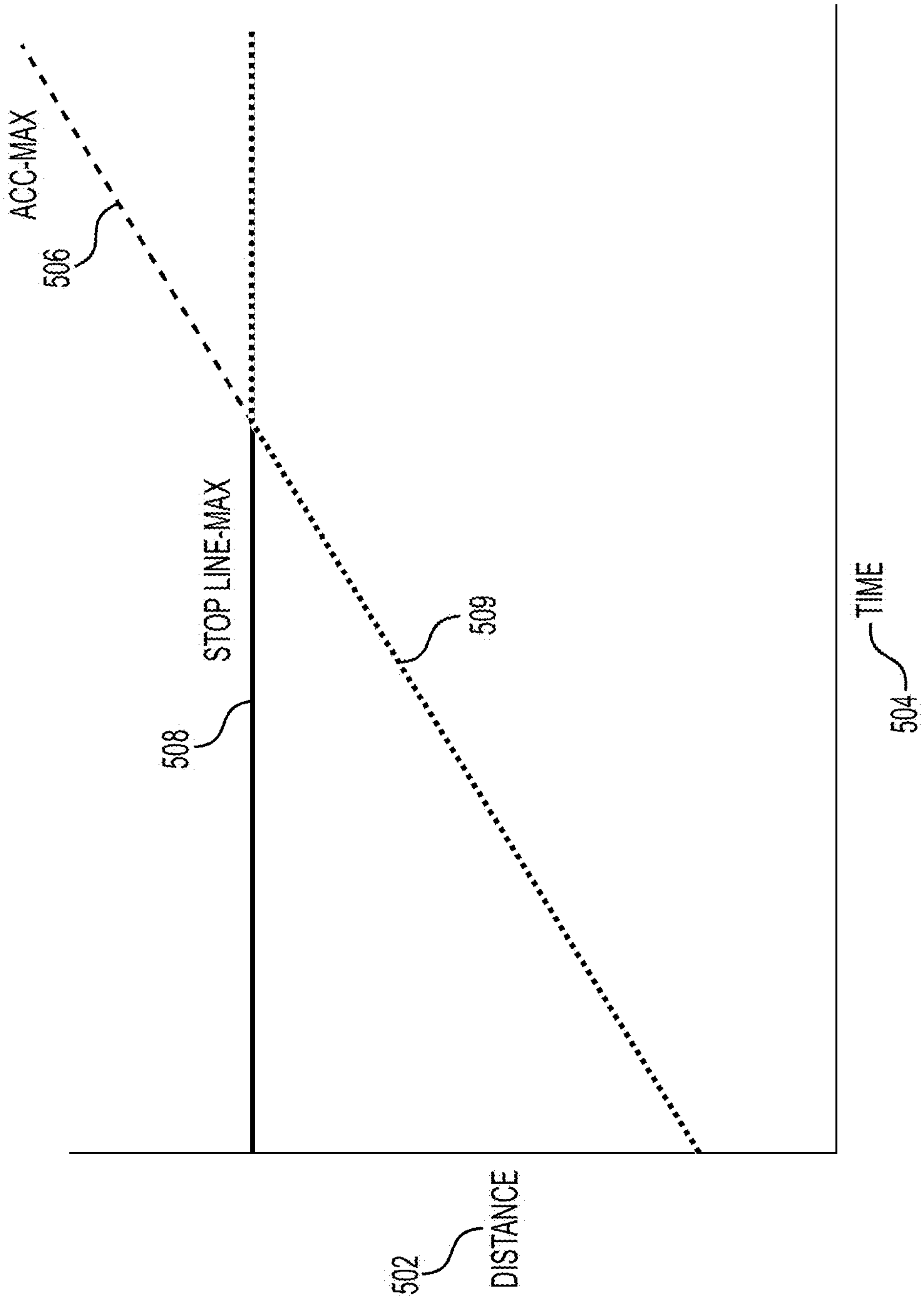
FIG. 5A depicts a chart showing a consolidated distance, according to an embodiment.
Figure 5B:
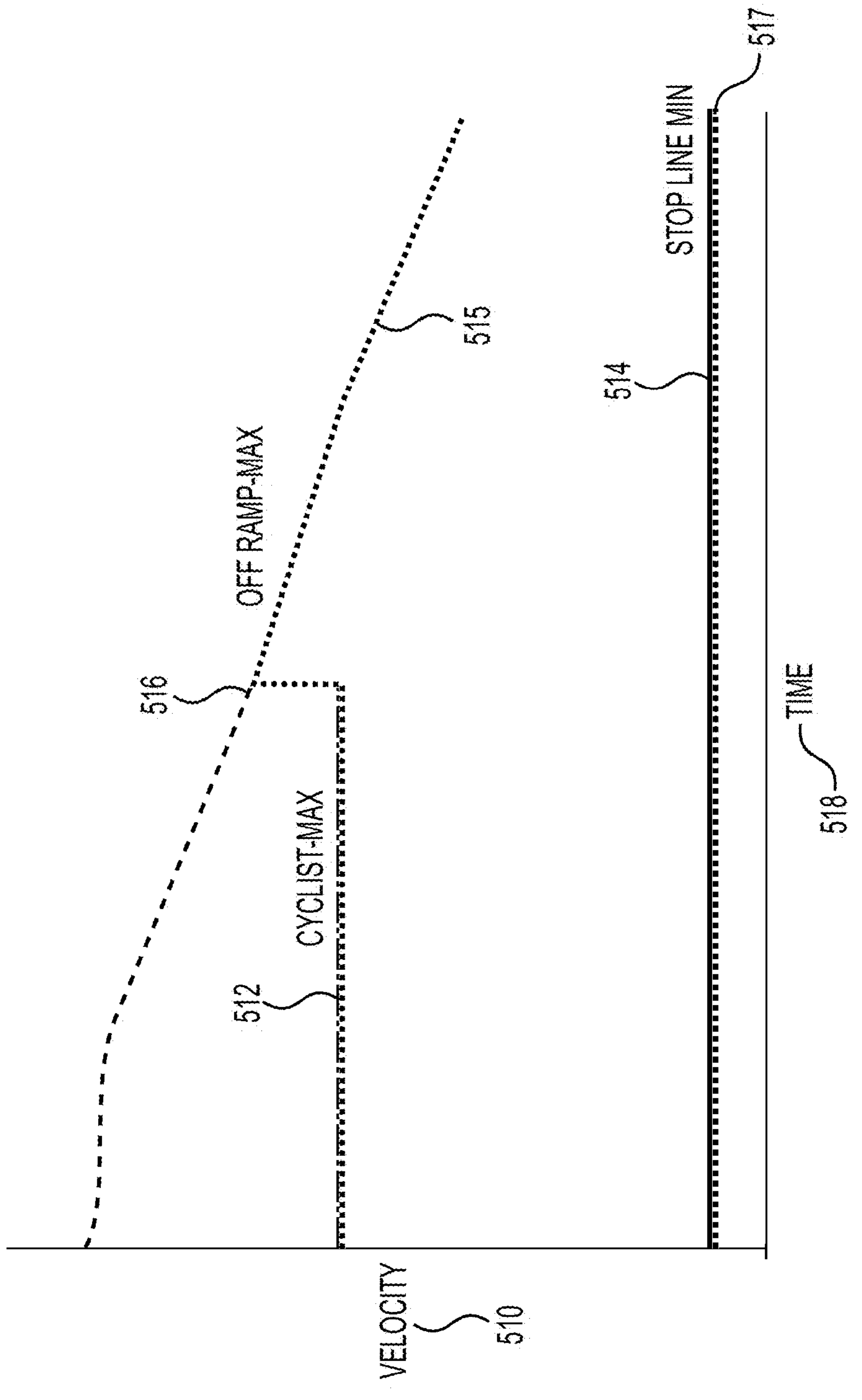
FIG. 5B depicts a chart showing a consolidated velocity bound, according to an embodiment.

Referring to FIGS. 5A and 5B, a consolidated most restricted maximum distance bound and most restricted velocity bounds are shown. FIG. 5A shows a distance 502 charted against a time 504 for allowed distance bounds generated by the vehicle 102. An ACC maximum distance bound 506 and a stop line max distance bound 508 are shown. The consolidated maximum distance bound 509 is limited first by the ACC maximum distance bound 506, then by the stop line maximum distance bound 508 with respect to time. FIG. 5B shows a velocity 510 plotted against a time 518. Referring to the scenario depicted in FIG. 1, maximum velocity bounds are generated based on the cyclist 126, the off ramp 124, and the stop sign 122 (stop line bound). The respective generated bounds are the cyclist maximum velocity bound 512, the off ramp maximum velocity bound 516, and the stop line minimum distance bound 514. The cyclist maximum velocity bound 512 and the off ramp maximum velocity bound 516 may be consolidated in the consolidated maximum velocity bound 515, which may represent the consolidated maximum velocity for a range (e.g., a defined range) of times from when the bounds are calculated. The maximum and minimum position and velocity bounds may be consolidated in, the longitudinal planner 214 of FIG. 2.

Figure 6:
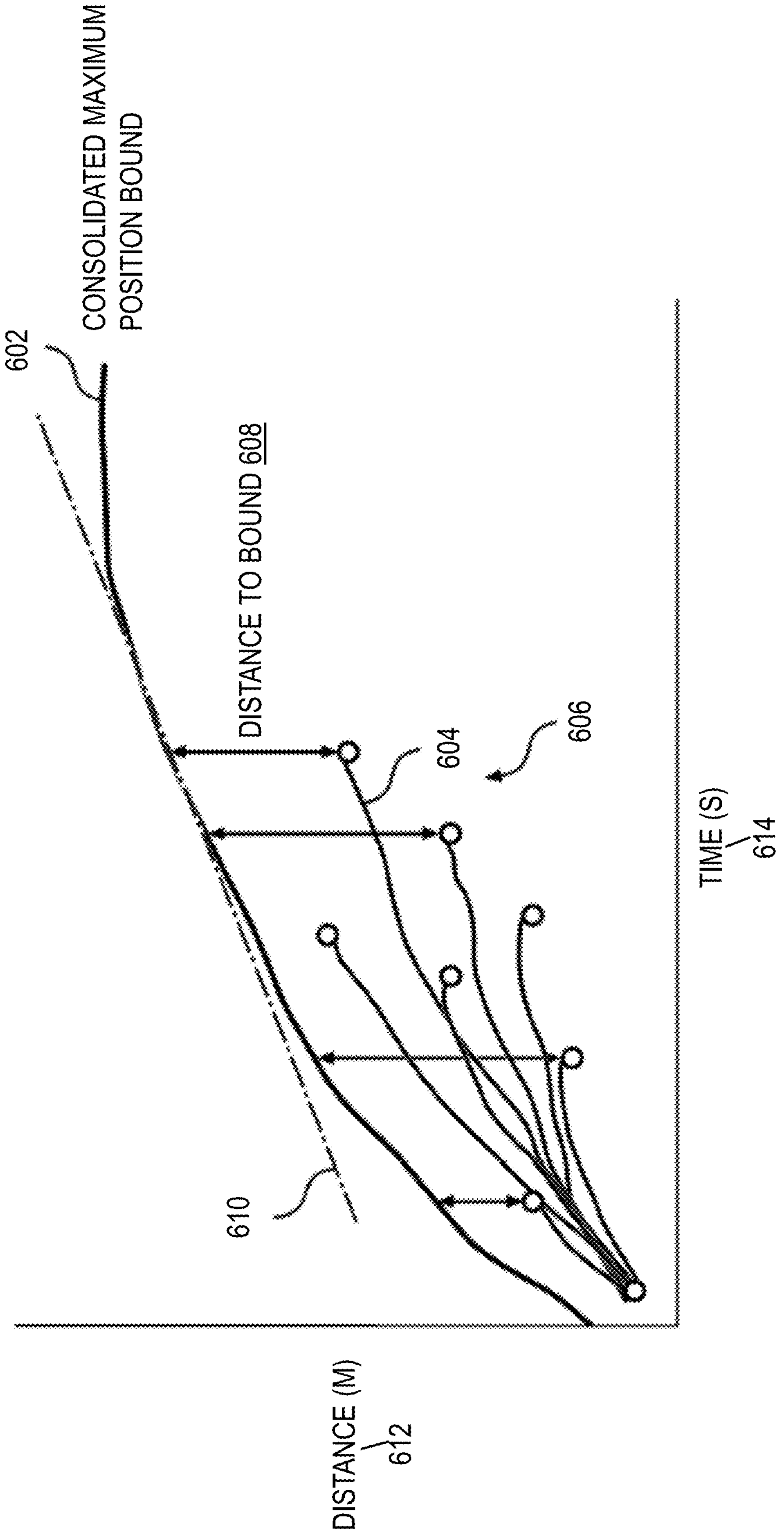
FIG. 6 depicts a consolidated maximum distance bound plotted with candidate trajectories, according to an embodiment.

Referring to FIGS. 3 and 6, at step 306, the system 100 may generate individual candidate trajectories 606 using, for example, the longitudinal planner 214. The candidate trajectories 606 may be minimum jerk trajectories (e.g., trajectories generated to minimize the jerk (e.g., the sum of the jerk (e.g., positive or negative acceleration) or the sum of the squared jerk at defined intervals of the individual trajectories). The candidate trajectories 606 can be generated by, for example, sampling final velocities and durations for a given range and step. Each candidate trajectory may take, for example, the form of a quartic polynomial. The initial position of a given trajectory may be "0" with respect to the ego vehicle (that is, the trajectory may start at the current position of the ego vehicle). The duration of each trajectory may be any time frame (for example, trajectories may be retrieved (e.g., sampled) with a duration of any of 0.5 seconds, 1 second, 1.5 seconds, etc.) In some embodiments, trajectories are sampled for any duration from 0.5 seconds to 15 seconds with a step of 05 seconds (i.e., 0.5 seconds, 1 second, 1.5 seconds . . . 15 seconds). In some embodiments, candidate trajectories may be calculated based on a particular time period, for example, candidate trajectories may be calculated at least every three seconds. Each of the candidate trajectories may have a position, velocity, and an acceleration over time. Each candidate trajectory can include or have a final velocity at the final time of the candidate trajectory. The final velocity can indicate the velocity at which the vehicle will continue traveling at the end of the candidate trajectory without further adjustments. Each candidate trajectory may include a distance (e.g., a predicted distance or a distance traveled) of the ego vehicle over a defined amount of time compared with an initial position of the vehicle (e.g., the position of the vehicle upon determining which candidate trajectory to select).

Still referring to FIG. 6, the various candidate trajectories 606 are shown, each comprising a trajectory distance 612, represented by its height on the chart, and lasting for a specified duration (or "time" 614). The chart in FIG. 6 shows a consolidated maximum distance bound 602, which is based on the consolidated maximum distance bound 509 of FIG. 5A. The candidate trajectory 604 may end some distance from the consolidated maximum distance bound 602 (here, a distance to bound 608 (for illustrative purposes, say approximately 110 meters)). However, when considering ideal velocity for any point relative to the distance bound, it is important to consider the velocity of the bound itself in addition to the distance to the bound, as ultimately the desire is to follow the distance bound over time. This is only possible if the velocity of the ego matches the velocity of the distance bound at the position of the distance bound. The velocity of a dynamic distance bound may be incorporated as an additional "available distance" to aid in selecting desirable target velocities for candidate trajectories. The available distance can be accounted for based on a slope of the consolidated maximum distance bound 602 at the ending time (e.g., end time) of a candidate trajectory 604.

Still referring to FIGS. 3 and 6, at step 308, the system 100 may calculate a derived velocity based on the consolidated maximum distance bound 602 at the ending time of a candidate trajectory for each of the candidate trajectories. The derived velocity is the slope of the consolidated maximum distance bound and has some magnitude. The derived velocity at the end point of the candidate trajectory 604 is graphically depicted as slope 610 in FIG. 6. The derived velocity 610 is used to determine an available distance in addition to the actual distance from the end point of the candidate trajectory 604 to the consolidated maximum distance bound as described herein. For the purposes of illustration, the derived velocity is 10 m/s.

Figure 7A:
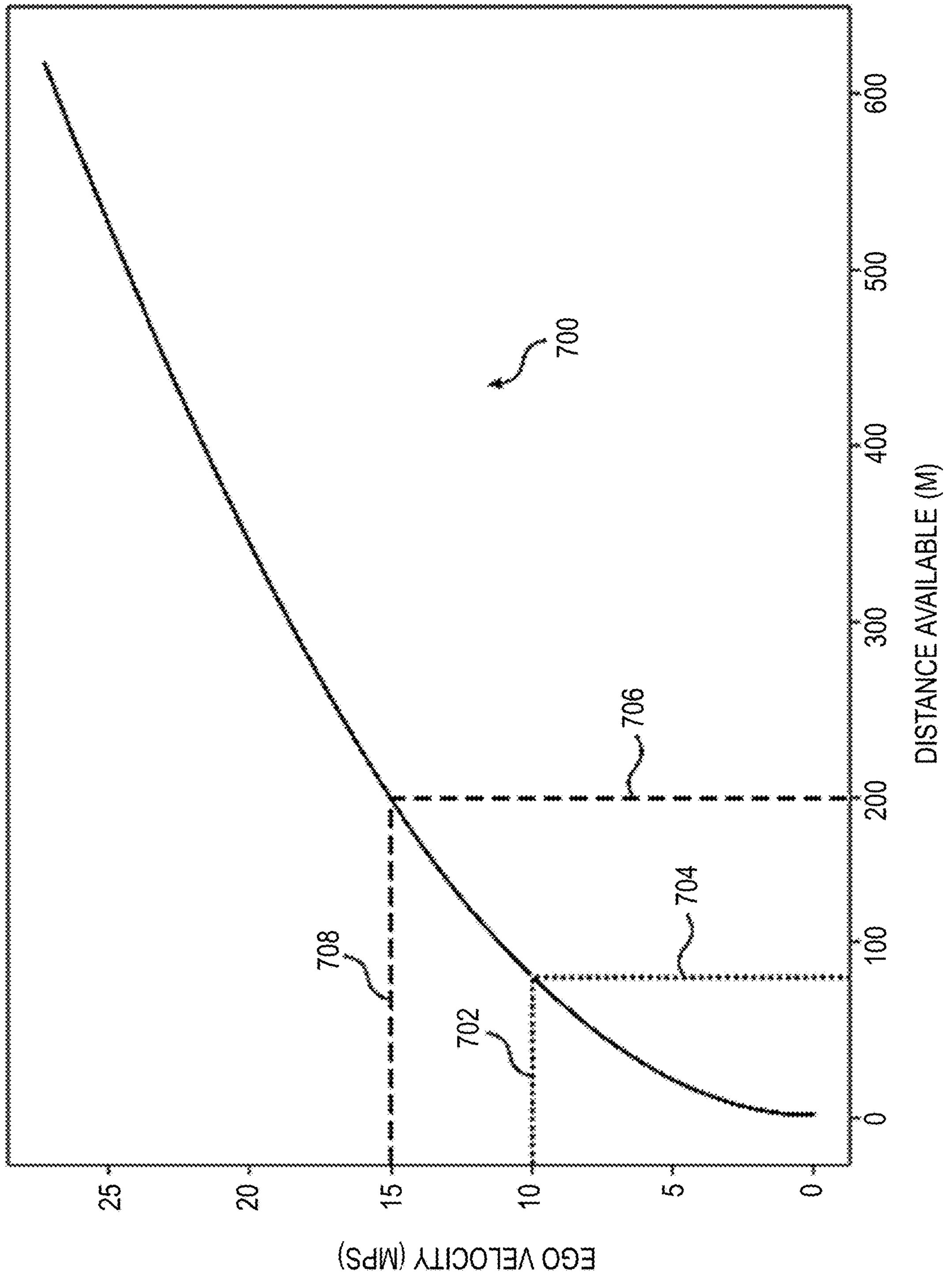
FIG. 7A depicts a comfort deceleration curve for generating and selecting a candidate trajectory, according to an embodiment.

At step 310, the system 100 may convert the derived velocity to an available distance. The system 100 may convert the derived velocity to the available distance using a value or set of values, for example, an acceleration curve. In the embodiments described with respect to FIG. 1, the system 100 uses a comfort deceleration curve (FIG. 7A) to perform the conversion. As shown in FIG. 7A, the derived velocity 702 may correspond with a particular distance 704 on the comfort deceleration curve 700. This distance (~90 m in the figure) is considered an additional "available distance" in determining target speed for the vehicle 102.

At step 312, the system 100 may account for the available distance in its determination of target speed for a candidate trajectory by adding the available distance 704 determined using the comfort deceleration curve 700 to the distance from the candidate trajectory's final distance from the distance to bound 608 from FIG. 6. This new distance may be referred to as a total distance. For example, the system 100 may sum the available distance 704 (~90 m) with the distance to bound 608 (~110 m) of FIG. 6.

At step 314*a*, the system 100 may use the total distance (for example, 200 m using the values discussed herein) determined above to determine a target velocity. For example, the system 100 may look up the velocity 708 for the total distance 706 using the comfort deceleration curve of FIG. 7A to determine a target velocity. The target velocity represents a velocity that the vehicle 102 should travel to reach the maximum consolidated distance bound at the maximum's consolidated distance bound's velocity. In the particular example shown in FIGS. 4*a*-7, the target velocity is 15 m/s, but this is merely an illustrative example, and any target velocity is possible. The system 100 may generate target velocities for each of the candidate trajectories 606 shown in FIG. 6 using the steps described herein. A candidate trajectory may be selected from the various candidate trajectories 606 based on the closeness of the candidate trajectory's final velocity compared with the target velocity determined for the candidate trajectory using the steps listed above.

Figure 7B:
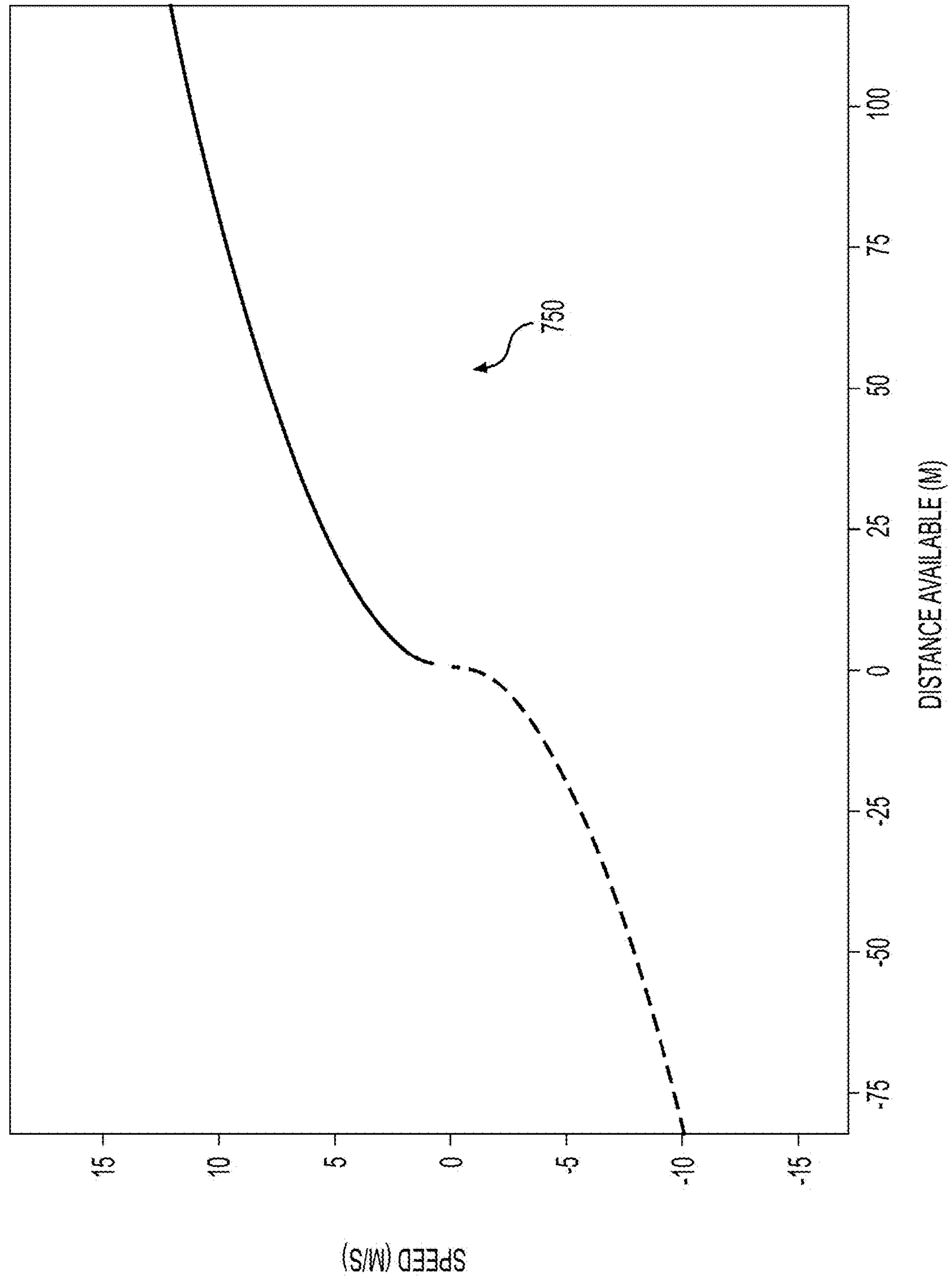
FIG. 7B depicts a ramp curve for generating and selecting a candidate trajectory, according to an embodiment.

In some embodiments, the particular value or set of values the system 100 may use to find the distance for a given velocity may be the ramp curve 750 of FIG. 7B, as shown at step 314*b*. For example, the system 100 may plot the total distance against a velocity using a ramp function to generate a ramp curve, such as the ramp curve of FIG. 7B, to determine a target velocity. The system 100 may calculate a target velocity using the ramp curve of FIG. 7B or a ramp function in addition to or in lieu of the calculation of a target velocity determined using the comfort deceleration curve of FIG. 7A above. In embodiments in which the system 100 calculates two or more target velocities for given candidate trajectories, the system 100 may ultimately choose the target velocity with a lower magnitude. For example, if the comfort deceleration curve yields a target velocity (e.g., a first target velocity) of 15 m/s and the ramp curve yields a target velocity (e.g., a second target velocity) of 10 m/s, the 10 m/s target velocity may be chosen for further use by the system 100 as described herein based on its conservative result. That is, the system would use this lower value as the distance bound-based target velocity. The ramp curve of FIG. 7B may be particularly utilized by the system, for example, when the distance to the maximum consolidated distance bound from a candidate trajectory's final position is a relatively low value (e.g., 8 m).

At step 316, the system 100 may compare the target velocity for the selected trajectory to the consolidated maximum velocity bound 515 (FIG. 5B) and may select the lower of the two values at step 318 to determine the maximum allowable velocity for the vehicle 102. For example, if the target velocity calculated is 15 m/s, but the maximum consolidated velocity based on the multiple maximum velocities generated by the various n behavior modules is 10 m/s, the system 100 would default to the 10 m/s maximum velocity to ensure that the maximum velocity bound is not violated. For example, if the target velocity determined based on the consolidated maximum distance bound has a value of 10 m/s and the consolidated maximum velocity bound has a value of 15 m/s, the system 100 can use the target velocity determined based on the consolidated maximum distance bound as a value on which to base the candidate trajectory's ideal target speed as opposed to the consolidated maximum velocity bound.

At step 320, the system 100 may evaluate each candidate trajectory for how well it matches a target velocity calculated for that particular candidate trajectory. For example, the system 100 can compare the target velocity at the ending time for each candidate trajectory with the final velocity (e.g., the velocity of the candidate trajectory at the ending time of the candidate trajectory) to determine or calculate velocity differences between the target velocities and the final velocities. The system 100 can use the velocity differences as a factor in determining the cost (a relative value indicating the benefits or the burden of selecting a particular candidate trajectory) for that particular candidate trajectory along with other factors. For example, the system 100 can determine a cost for each candidate trajectory based at least on the velocity difference for the candidate trajectory (e.g., the system 100 can determine higher costs for higher velocity differences or lower costs for lower velocity differences). The system 100 can determine the costs for the candidate trajectories based on other factors, such as stored rankings (e.g., rankings relative to each other candidate trajectory) for the candidate trajectories, the maximum or minimum acceleration of the each of the candidate trajectories, the distance traveled for the candidate trajectories, etc. The system 100 can determine such costs based on an average or weighted average of the factors, for example. In some cases, the costs can be equal to the velocity differences for the candidate trajectories.

At step 322, the system 100 may select the candidate trajectory from the longitudinal planner 214, for example, with the lowest overall cost. For example, the system 100 can compare the costs for the candidate trajectories with each other. Based on the comparison, the system 100 can identify the candidate trajectory with the lowest cost or lowest velocity difference (or the highest cost or highest velocity difference, depending on the configuration of the system 100). The system 100 can select the identified candidate trajectory for operation of the vehicle. The system 100 can send the selected candidate trajectory (e.g., selected longitudinal candidate trajectory) to the motion control module 218 along with a lateral motion component from the lateral planner 212. The longitudinal component and the lateral component may be used to control the path of the vehicle 102. At step 324, the system 100 can operate the vehicle based on the selected candidate trajectory (e.g., operate the vehicle to have the velocity or velocities of the selected candidate trajectory).

In one non-limiting example, the system 100 can select a candidate trajectory using a sequence of algorithms to control a vehicle. For example, the system can generate or retrieve a plurality of candidate trajectories. The system 100 can generate or retrieve the plurality of candidate trajectories by sampling a range of end times and/or a range of final velocities. The system 100 can execute the following sequence of algorithms for each of the plurality of candidate trajectories:

1. Distance to bound=position bound (trajectory end time)−trajectory end position (trajectory end time);
2. Velocity of position bound=derivative of position bound (trajectory end time);
3. Distance of position bound=(velocity of position bound^2)/(2*comfort deceleration parameter) (e.g., determine the distance of position bound by comparing the velocity of position bound to a comfort deceleration curve (e.g., the comfort deceleration curve 700);
4. Distance available=distance to bound+distance of position bound; and
5. Target velocity=sqrt (2*comfort deceleration parameter*distance available) (e.g., determine the target velocity by comparing the distance available to a comfort deceleration curve (e.g., the comfort deceleration curve 700));

where distance to bound can be the distance between the end distance or position of the candidate trajectory and a maximum distance bound (e.g., a maximum distance bound generated based on objects around a vehicle); position bound (trajectory end time) can be the position or distance of the maximum distance bound at the end time of the candidate trajectory; trajectory end position (trajectory end time) can be the position or distance of the vehicle at the end of the candidate trajectory, relative to the initial position of the vehicle at the end of the candidate trajectory; velocity of position bound can be the velocity of the maximum distance bound at a point in time (e.g., an ending time of the candidate trajectory) (which can be calculated by calculating the derivative of the maximum distance bound at the ending time of the candidate trajectory); and the comfort deceleration parameter can be a defined value. In some embodiments, the computer can perform the sequence of algorithms using a comfort deceleration curve (e.g., the comfort deceleration curve 700) as described above. The system 100 can compare the target velocity with the candidate trajectory's final velocity to determine a velocity difference between the target velocity and the final velocity. The system can similarly determine velocity differences for each candidate trajectory. The system 100 can select the candidate trajectory with the lowest velocity difference. The system 100 can operate the vehicle based on the selected candidate trajectory.

Using the slope of the position bound (by taking the derivative) can be important to determine whether the vehicle would arrive at the maximum distance bound at the correct velocity. For example, if the vehicle were approaching a stop sign, the vehicle would need to stop at the stop sign to comply with regulatory road laws. Selecting a candidate trajectory that would cause the vehicle to still be moving upon arriving at the stop sign would be incorrect. In another example, if the vehicle were to reach a defined distance behind a lead car, the vehicle should reach that distance behind the lead car at the speed of the lead car. If the distance behind the lead car is too large, the vehicle should be traveling faster than the lead to reach the defined distance.

Using the slope of the maximum distance bound and transforming the slope into an available distance can flatten position bounds into a universal goal to compare candidate trajectories to for different scenarios. The system 100 can transform the slope by inverting (e.g., calculating the integral of) the slope into a distance value, adding the distance value to an actual distance value to obtain an aggregate distance value, and converting the aggregate distance value back into a velocity.

The system can use a maximum velocity bound by taking the smaller of the resulting target velocity and the maximum velocity bound itself. In practice, doing so can result in the vehicle not achieving one goal or target (e.g., catching a lead car) because another goal or target (e.g., complying a speed limit) is blocking the initial goal or target, but can ensure the vehicle does not exceed any maximum speed limits caused by one or more objects (e.g., a pedestrian or a speed limit sign).

Figure 8:
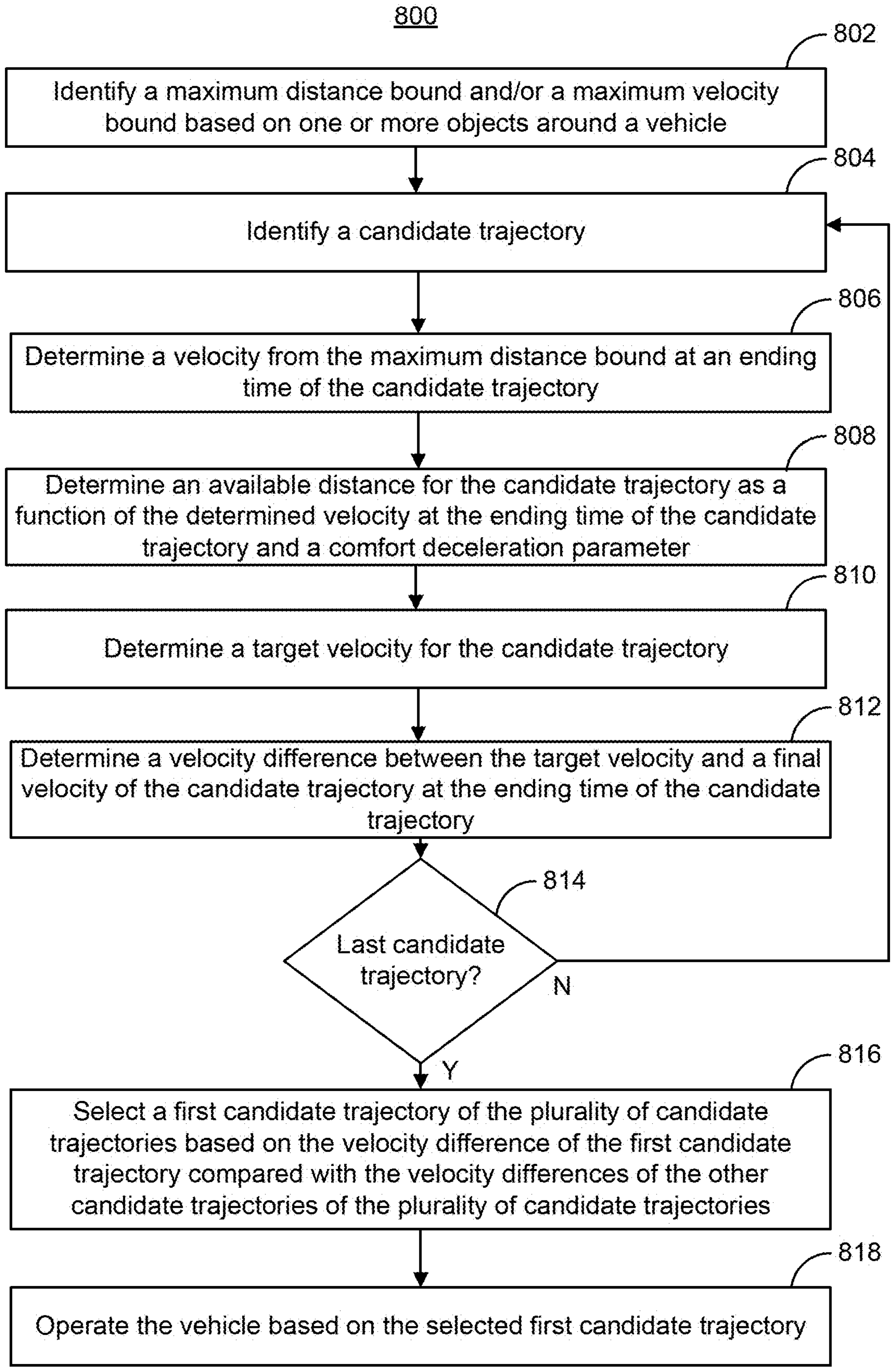
FIG. 8 depicts a method for generating and evaluating a candidate trajectory using a system, according to an embodiment.

FIG. 8 illustrates a flow diagram of a method 800, according to an embodiment. The method 800 includes steps 802-818. However, other embodiments may include additional or alternative execution steps, or may omit one or more steps altogether. One or more steps of the method 800 can be performed in conjunction with and/or instead of the one or more steps of the method 300. However, one or more steps of method 800 may also be executed by any number of computing devices. The method 800 is described as being executed by a data processing system similar to or the same as the controller 200 described in FIG. 2 or by a cloud server (e.g., a server communicating or controlling a vehicle over a network). For instance, one or more computing devices (e.g., end-user devices) may locally perform part or all of the steps described with respect to FIG. 8.

At step 802, the data processing system can identify a maximum distance bound and/or a maximum velocity bound based on one or more objects around a vehicle (e.g., an ego vehicle). The data processing system can identify the maximum distance bound and/or the maximum velocity bound based on objects around the vehicle. At step 804, the data processing system can identify a candidate trajectory. The data processing system can identify the candidate trajectory from a plurality of candidate trajectories stored in memory. At step 806, the data processing system can determine (e.g., derive) a velocity from the maximum distance bound at an ending time of the candidate trajectory. The data processing system can do so by calculating a slope (e.g., a derivative) of the maximum distance bound at an ending time of the candidate trajectory. At step 808, the data processing system can determine an available distance for the candidate trajectory. The data processing system can determine the available distance for the candidate trajectory as a function of the determined velocity at the ending time of the candidate trajectory and a comfort deceleration parameter. The data processing system can compare the derived velocity with a comfort deceleration curve to determine the available distance, in some cases. At step 810, the data processing system can determine a target velocity for the candidate trajectory. To do so, in some cases, the data processing system can calculate a sum of (i) the available distance, and (ii) a distance between a distance at the ending time of the candidate trajectory and a distance of the maximum distance bound at the ending time of the candidate trajectory. The sum can be a total distance. The data processing system can compare the sum with the comfort deceleration curve to determine the target velocity for the candidate trajectory. The data processing system can determine the target velocity for the candidate trajectory as a function of the available distance for the candidate trajectory, a difference between a distance at the ending time of the candidate trajectory and a distance of the maximum distance bound at the ending time of the candidate trajectory, and the comfort deceleration parameter.

At step 812, the data processing system can determine or calculate a velocity difference between the target velocity and a final velocity of the candidate trajectory at the ending time of the candidate trajectory. The data processing system can do so by comparing the target velocity at the ending time of the candidate trajectory with the final velocity of the candidate trajectory. At step 814, the data processing system can determine whether there are any more candidate trajectories (e.g., determine whether the data processing system has calculated a velocity difference for each candidate trajectory). Responsive to determining the data processing system has not calculated a velocity difference for each candidate trajectory, the data processing system can return to the step 804 and repeat steps 804-812.

Responsive to determining the data processing system has calculated velocity differences for candidate trajectories (e.g., candidate trajectories in memory or that the data processing system sampled according to a defined range and/or time step), at step 816, the data processing system can select a candidate trajectory (e.g., a first candidate trajectory) of the plurality of candidate trajectories. The data processing system can select the candidate trajectory based on the velocity difference of the candidate trajectory compared with the velocity differences of the other candidate trajectories of the plurality of candidate trajectories. In one example of doing so, the data processing system can calculate costs for each of the candidate trajectories based at least on the velocity differences of the respective candidate trajectories and compare the costs between each other. The data processing system can select the candidate trajectory responsive to the candidate trajectory having the lowest cost, for example. At step 818, the data processing system can operate the vehicle based on the selected candidate trajectory.

It should be understood that a vehicle may determine one or more constraints (represented as bounds) based on various desired or required behaviors of the vehicle and select a trajectory for implementation based on maximum and minimum consolidated distance and velocity bounds. The maximum and minimum consolidated distance and velocity bounds may be checked against various dynamic objects in the environment surrounding the vehicle such that the vehicle may maximize its operational speed while operating safely within its maneuverability envelope. It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as examples only, with a true scope of the disclosure being indicated by the following claims and their equivalents.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

I claim:

1. A controller of an autonomous vehicle, comprising at least one processor in communication with at least one memory, the at least one processor programmed to:
- identify a maximum distance bound based on one or more objects around an autonomous vehicle;
- generate a plurality of candidate trajectories of the autonomous vehicle by reducing jerks in each candidate trajectory of the plurality of candidate trajectories;
- for the each candidate trajectory,
  - determine a velocity corresponding to the maximum distance bound at an ending time of the each candidate trajectory;
  - determine an available distance of the each candidate trajectory based on a function of velocity versus distance using the velocity;
  - determine a target velocity of the each candidate trajectory based on the function of velocity versus distance using i) the available distance and ii) a difference between a distance at the ending time of the each candidate trajectory and a distance of the maximum distance bound at the ending time of the each candidate trajectory;
  - determine a velocity difference between the target velocity and a final velocity of the each candidate trajectory at the ending time of the each candidate trajectory;
- select a first candidate trajectory from the plurality of candidate trajectories based on a velocity difference of the first candidate trajectory and velocity differences of other candidate trajectories in the plurality of candidate trajectories; and
- control operation of the autonomous vehicle based on the first candidate trajectory.

2. The controller of claim 1, wherein the at least one processor is further programmed to:
- generate the plurality of candidate trajectories by minimizing a sum of the jerks in the each candidate trajectory.

3. The controller of claim 1, wherein the at least one processor is further programmed to:
- generate the plurality of candidate trajectories by minimizing a sum of squared jerks in the each candidate trajectory.

4. The controller of claim 1, wherein the at least one processor is further programmed to:
- generate the plurality of candidate trajectories by determining the jerks based at least in part on acceleration in the each candidate trajectory.

5. The controller of claim 1, wherein the at least one processor is further programmed to:
- determine the available distance based on the function of velocity versus distance, wherein the function of velocity versus distance is represented as a comfort deceleration curve.

6. The controller of claim 1, wherein the at least one processor is further programmed to:
- determine the available distance based on the function of velocity versus distance, wherein the function of velocity versus distance is represented as a ramp curve.

7. The controller of claim 1, wherein the at least one processor is further programmed to:
- determine the velocity by determining a slope of the maximum distance bound at the ending time of the each candidate trajectory.

8. A computer-implemented method for planning trajectories of an autonomous vehicle, the method comprising:
- identifying a maximum distance bound based on one or more objects around an autonomous vehicle;
- for each candidate trajectory of a plurality of candidate trajectories of the autonomous vehicle,
  - determining a velocity corresponding to the maximum distance bound at an ending time of the each candidate trajectory;
  - determining an available distance of the each candidate trajectory based on a function of velocity versus distance using the velocity;
  - determining a target velocity of the each candidate trajectory based on the function of velocity versus distance using i) the available distance and ii) a difference between a distance at the ending time of the each candidate trajectory and a distance of the maximum distance bound at the ending time of the each candidate trajectory; and
  - determining a velocity difference between the target velocity and a final velocity of the each candidate trajectory at the ending time of the each candidate trajectory;
- selecting a first candidate trajectory from the plurality of candidate trajectories based on a velocity difference of the first candidate trajectory and velocity differences of other candidate trajectories in the plurality of candidate trajectories; and
- controlling operation of the autonomous vehicle based on the first candidate trajectory.

9. The method of claim 8, further comprising:
- generating the plurality of candidate trajectories by reducing jerks in each candidate trajectory of the plurality of candidate trajectories.

10. The method of claim 9, wherein generating the plurality of candidate trajectories further comprises:
- minimizing a sum of the jerks or a sum of squared jerks in the each candidate trajectory.

11. The method of claim 8, wherein determining the available distance further comprises:
- determining the available distance based on the function of velocity versus distance, wherein the function of velocity versus distance is represented as a comfort deceleration curve.

12. The method of claim 8, wherein determining the available distance further comprises:
- determining the available distance based on the function of velocity versus distance, wherein the function of velocity versus distance is represented as a ramp curve.

13. The method of claim 8, wherein determining the velocity further comprises:
- determining the velocity by determining a slope of the maximum distance bound at the ending time of the each candidate trajectory.

14. One or more non-transitory machine-readable storage media for planning trajectories of an autonomous vehicle, the one or more non-transitory machine-readable storage media comprising a plurality of instructions stored thereon that, in response to being executed, cause a system to:

identify a maximum distance bound based on one or more objects around an autonomous vehicle;

generate a plurality of candidate trajectories of the autonomous vehicle by reducing jerks in each candidate trajectory of the plurality of candidate trajectories;

for the each candidate trajectory, determine a velocity corresponding to the maximum distance bound at an ending time of the each candidate trajectory;

determine an available distance of the each candidate trajectory based on a function of velocity versus distance using the velocity;

determine a target velocity of the each candidate trajectory based on the function of velocity versus distance using i) the available distance and ii) a difference between a distance at the ending time of the each candidate trajectory and a distance of the maximum distance bound at the ending time of the each candidate trajectory;

determine a velocity difference between the target velocity and a final velocity of the each candidate trajectory at the ending time of the each candidate trajectory;

select a first candidate trajectory from the plurality of candidate trajectories based on a velocity difference of the first candidate trajectory and velocity differences of other candidate trajectories in the plurality of candidate trajectories; and control operation of the autonomous vehicle based on the first candidate trajectory.

15. The one or more non-transitory machine-readable storage media of claim 14, wherein the plurality of instructions further cause the system to:

generate the plurality of candidate trajectories by minimizing a sum of the jerks in the each candidate trajectory.

16. The one or more non-transitory machine-readable storage media of claim 14, wherein the plurality of instructions further cause the system to:

generate the plurality of candidate trajectories by minimizing a sum of squared jerks in the each candidate trajectory.

17. The one or more non-transitory machine-readable storage media of claim 14, wherein the plurality of instructions further cause the system to:

generate the plurality of candidate trajectories by determining the jerks based at least in part on acceleration in the each candidate trajectory.

18. The one or more non-transitory machine-readable storage media of claim 14, wherein the plurality of instructions further cause the system to:

determine the available distance based on the function of velocity versus distance, wherein the function of velocity versus distance is represented as a comfort deceleration curve.

19. The one or more non-transitory machine-readable storage media of claim 14, wherein the plurality of instructions further cause the system to:

determine the available distance based on the function of velocity versus distance, wherein the function of velocity versus distance is represented as a ramp curve.

20. The one or more non-transitory machine-readable storage media of claim 14, wherein the plurality of instructions further cause the system to:

determine the velocity by determining a slope of the maximum distance bound at the ending time of the each candidate trajectory.

* * * * *